(12) United States Patent
Zhang et al.

(10) Patent No.: US 11,851,001 B1
(45) Date of Patent: Dec. 26, 2023

(54) MOOD LAMP WITH DYNAMIC EFFECT AND VEHICLE PROVIDED WITH THE SAME

(71) Applicants: HYUNDAI MOTOR COMPANY, Seoul (KR); Kia Corporation, Seoul (KR)

(72) Inventors: Miao Miao Zhang, Shandong (CN); Chunlei Sang, Shandong (CN); Hyukjae Kwon, Anyang-si (KR); Won Young Bae, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/076,722

(22) Filed: Dec. 7, 2022

(30) Foreign Application Priority Data

Jun. 22, 2022 (CN) .......................... 202210712875.9

(51) Int. Cl.
| | |
|---|---|
| *B60Q 3/70* | (2017.01) |
| *F21V 8/00* | (2006.01) |
| *B60Q 3/51* | (2017.01) |
| *B60Q 3/62* | (2017.01) |
| *B60Q 3/64* | (2017.01) |
| *B60Q 3/66* | (2017.01) |
| *B60Q 3/54* | (2017.01) |
| *B60Q 3/78* | (2017.01) |

(52) U.S. Cl.
CPC .................. *B60Q 3/70* (2017.02); *B60Q 3/51* (2017.02); *B60Q 3/54* (2017.02); *B60Q 3/62* (2017.02); *B60Q 3/64* (2017.02); *B60Q 3/66* (2017.02); *B60Q 3/78* (2017.02); *G02B 6/0031* (2013.01); *G02B 6/0088* (2013.01)

(58) Field of Classification Search
CPC ................................. B60Q 3/54; B60R 13/02
See application file for complete search history.

(56) References Cited

U.S. PATENT DOCUMENTS

2020/0103093 A1* 4/2020 Negel .................. B60Q 1/2661

FOREIGN PATENT DOCUMENTS

| GB | 2566258 B | * | 1/2020 | ............... B60Q 3/14 |
|---|---|---|---|---|
| JP | 6154408 B2 | | 6/2017 | |
| KR | 10-1108099 B1 | | 1/2012 | |
| KR | 10-1856527 B1 | | 5/2018 | |

* cited by examiner

*Primary Examiner* — Keith G. Delahoussaye
(74) *Attorney, Agent, or Firm* — MORGAN, LEWIS & BOCKIUS LLP (57) ABSTRACT

A mood lamp with dynamic effect and a vehicle provided with the mood lamp may include a bracket mounted on a vehicle body; a cover provided on the bracket and used to form an appearance of the mood lamp; a light guide plate provided in an accommodation space formed by the cover and the bracket, adjacent to the cover, and including a surface close to the cover and including an uneven wave pattern, wherein a metal plating layer is provided on the surface including the wave pattern; a light source provided in the accommodation space to be close to one side of the light guide plate and far away from the other side of the light guide plate; and a light reflection film provided in the accommodation space and reflecting a light emitted by the light source to a surface of the light guide plate far away from the cover.

11 Claims, 8 Drawing Sheets

MOOD LAMP WITH DYNAMIC EFFECT AND VEHICLE PROVIDED WITH THE SAME

CROSS-REFERENCE TO RELATED APPLICATION

The present application claims priority to Chinese Patent Application No. 202210712875.9 filed in the Chinese National Intellectual Property Administration on Jun. 22, 2022, the entire contents of which is incorporated herein for all purposes by this reference.

BACKGROUND OF THE PRESENT DISCLOSURE

Field of the Present Disclosure

The present disclosure relates to a vehicle field, and more particularly to, a mood lamp with dynamic effect and a vehicle provided with the mood lamp.

Description of Related Art

Mood lamps currently adjust light emission by use of a light string or a light guide in an indirect or direct lighting method, in which covers use a light transmitting material, and surfaces are laser engraved and implement a lighting effect with a specific pattern. However, a problem present in the mood lamp is that the existing structure may not be used when the mood lamp emits light on a specific plane or curved surface and produces various rhythm effects. Furthermore, when a chrome should be plated on the surface, the light emission of the existing structure was weak.

Therefore, the existing mood lamp needs further improvement.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a mood lamp with dynamic effect and a vehicle provided with the mood lamp. According to a mood lamp with a dynamic effect, when power of a light source is turned on, light of the light source is reflected by a light reflection film and then passes through a light guide plate and a cover, implementing light emission. Because the light source is close to a first side of the light guide plate and far away from a second side of the light guide plate, the mood lamp may emit light so that brightness is gradually changed. When the power of the light source is turned off, the mood lamp becomes a decoration panel with a metallic decoration effect of a wave pattern, improving a layered feeling and luxury feeling of a vehicle interior material.

Various aspects of the present disclosure are directed to providing a mood lamp with a dynamic effect. The mood lamp may include: a bracket configured to be mounted on a vehicle body; a cover provided on the bracket and used to form an appearance of the mood lamp; a light guide plate provided in an accommodation space formed by the cover and the bracket, adjacent to the cover, and including a surface close to the cover and including an uneven wave pattern, wherein a metal plating layer is provided on the surface including the wave pattern; a light source provided in the accommodation space to be close to a first side of the light guide plate and far away from a second side of the light guide plate; and a light reflection film provided in the accommodation space and reflecting a light emitted by the light source to a surface of the light guide plate far away from the cover, wherein the reflected light sequentially passes through the light guide plate and the cover, and is then emitted to an outside of the cover.

The cover may be made of a PC material, and an external surface may be a flat surface.

The external surface of the cover may have a leather pattern to form a translucent matte effect.

The surface of the light guide plate including the wave pattern may form the metal plating layer through vacuum aluminum plating or vacuum chrome plating.

An edge portion of the cover may be provided on an interior material of a vehicle to form an exposed portion and an insertion portion, an area of the light guide plate may be greater than an area of the exposed portion, and an inclined transition portion may be formed at a position of the light guide plate corresponding to the insertion portion.

The light source may be supported by an upper wall or a lower wall of the bracket, and the light source may be positioned outside a range covered by the exposed portion.

The light source may include a light source board and one or more LEDs provided on the light source board, and the light source board may be electrically connected to a driving circuit board for controlling the one or more LEDs through a plug assembly.

The light source board may include two or more sub boards, and the respective sub boards may be electrically connected to each other through a plug assembly.

The light-emitting diode (LED) may be a smart LED, and the driving circuit board may include a controller.

A light film may have a flat surface inclined to have a constant angle between the flat surface and the light guide plate so that the light emitted from the light source is directed toward the light guide plate.

The power of each of the LEDs may be 0.1 W to 1 W, and a distance between the respective LEDs is 20 mm to 40 mm.

Various aspects of the present disclosure are directed to providing a vehicle provided with the mood lamp with the dynamic effect according to the one aspect of the present disclosure.

According to an exemplary embodiment of the present disclosure, when power of a light source is turned on, light of the light source is reflected by a light reflection film and then passes through a light guide plate and a cover, implementing light emission. Because the light source is close to a first side of the light guide plate and far away from a second side of the light guide plate, the mood lamp may emit light so that brightness is gradually changed. When the power of the light source is turned off, the mood lamp becomes a decoration panel with a wavy metal decoration effect, improving a layered feeling and luxury feeling of a vehicle interior material. Furthermore, the mood lamp has the metal decoration effect but does not require a laser engraving process, reducing the cost of a laser engraving process.

The method and apparatus of the present disclosure have other characteristics and advantages. Such characteristics and advantages will become apparent from the accompanying drawings and the exemplary embodiment to be described below or will be described in detail in the accompanying drawings and the exemplary embodiment to be described below. Both the drawings and the exemplary embodiment are intended to interpret certain principles of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinafter, these embodiments will be exemplified in the drawings and will be described later with reference to various exemplary embodiments of the present disclosure in detail. While the present disclosure has been described in conjunction with exemplary embodiments of the present disclosure, it should be understood that the present specification is not intended to limit the present disclosure to these exemplary embodiments of the present disclosure. To the contrary, the present disclosure not only includes these exemplary embodiments of the present disclosure, but also includes various alternatives, modifications, equivalents, and other embodiments within the scope of the spirit of the present disclosure and the scope of the appended claims.

Hereinafter, a mood lamp with a dynamic effect according to various exemplary embodiments of the present disclosure will be described by combining FIG. 1, FIG. 2, FIG. 3, FIG. 4, FIG. 5, FIG. 6, FIG. 7, and FIG. 8.

As shown in FIG. 1, FIG. 2, FIG. 3, FIG. 4, FIG. 5, FIG. 6, FIG. 7, and FIG. 8, a mood lamp with a dynamic effect according to various exemplary embodiments of the present disclosure includes a bracket 1, a cover 2, a light guide plate 3, a light source 4, and a light reflection film 5.

The bracket 1 is mounted on a vehicle body.

The cover 2 is provided on the bracket 1 and is used to form an appearance of the mood lamp.

The light guide plate 3 is provided in an accommodation space 11 formed by the cover 2 and the bracket 1 (see FIG. 5 and FIG. 6), and is adjacent to the cover 2. A surface of the light guide plate 3 close to the cover 2 has an uneven wave pattern, and a metal plating layer 32 is provided on the surface including the wave pattern (see FIG. 4).

Figure 5:
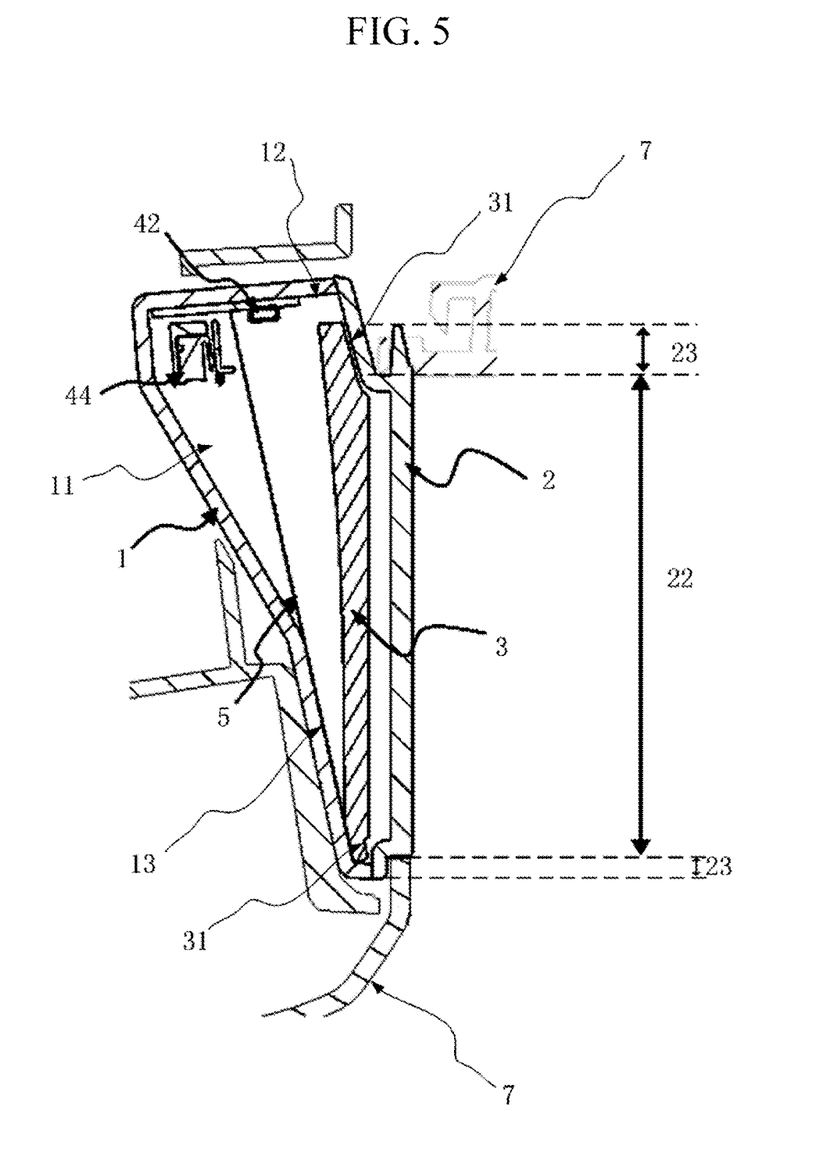
FIG. 5 is a cross-sectional view taken along a line B-B in FIG. 2.
Figure 6:
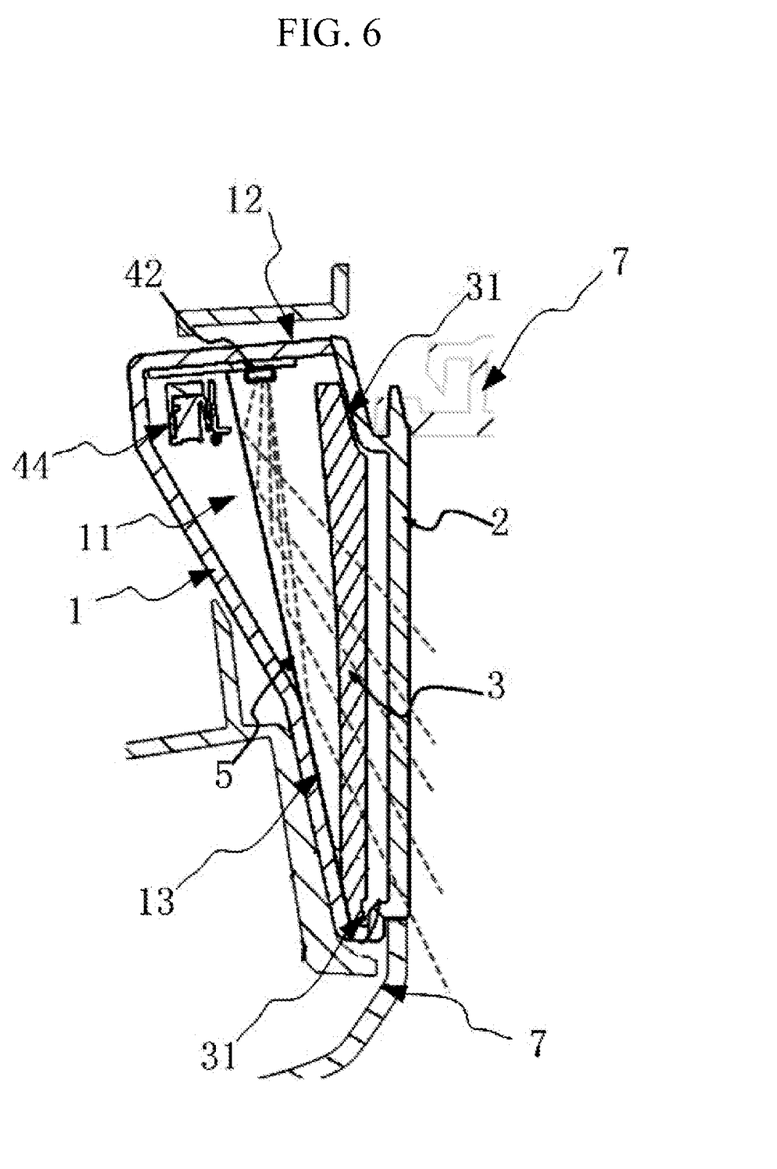
FIG. 6 is a schematic view of a path of light in a mood lamp with a dynamic effect according to various exemplary embodiments of the present disclosure corresponding to FIG. 5.

The light source 4 is provided in the accommodation space 11 to be close to one side of the light guide plate 3 and far away from the other side of the light guide plate 3 (that is, the light source 4 in FIG. 5 and FIG. 6 is closer to an upper side of the light guide plate 3 and far away from a lower side of the light guide plate 3).

The light reflection film 5 is provided in the accommodation space 11, and reflects light emitted by the light source 4 to a surface far away from the cover 2 of the light guide plate 3.

Additionally, the reflected light sequentially passes through the light guide plate 3 and the cover 2, and then is emitted to an outside of the cover 2.

When power of the light source 4 is turned on, the light of the light source 4 may be reflected by the light reflection film 5 and then pass through the light guide plate 3 and the cover 2 to emit light. Because the light source 4 is close to one side of the light guide plate 3 and far away from the other side of the light guide plate 3 (that is, in FIG. 5 and FIG. 6, because the light source 4 is close to the upper side of the light guide plate 3, and is far away from the lower side of the light guide plate 3), the mood lamp may emit the light so that brightness is gradually changed.

When the power of the light source 4 is turned off, because the surface of the light guide plate 3 close to the cover 2 has an uneven wave pattern and the metal plating layer 32 is provided on the surface including the wave pattern (see FIG. 4), the mood lamp becomes a decoration panel with a metallic decoration effect of a wave pattern, improving a layered feeling and luxury feeling of an interior material of a vehicle. Furthermore, the mood lamp has the metal decoration effect but does not require a laser engraving process, reducing the cost of the laser engraving process.

All mood lamps with the dynamic effect according to the exemplary embodiment of the present disclosure are exemplified that the cover 2 and the bracket 1 are positioned on the same horizontal plane. However, an angle of the overall mood lamp may be arbitrarily adjusted according to actual design requirements. For example, the cover 2 may be provided above the bracket 1 (i.e., rotating FIG. 5 counterclockwise by 90 degrees), the cover 2 may be provided below the bracket 1 (i.e., rotating FIG. 5 clockwise by 90 degrees), or the cover 2 may be provided diagonally on an upper portion of the bracket 1.

In an exemplary embodiment of the present disclosure, because the cover 2 includes a Polycarbonate (PC) material, and an external surface of the cover 2 is a flat plane (see FIG. 3 and FIG. 4) to be still flat when actually touched, a stereoscopic layered feeling is visually but not excessively emphasized, improving the overall aesthetics and luxury feeling of the internal decoration of the vehicle.

In an exemplary embodiment of the present disclosure, the external surface of the cover 2 may undergo a leather pattern process to form a translucent matte effect. Therefore, when the power of the light source 4 is turned off, the mood lamp becomes a decoration panel with a matte effect of a wave pattern, improving the layered feeling and luxury feeling of the interior material of the vehicle.

Figure 1:
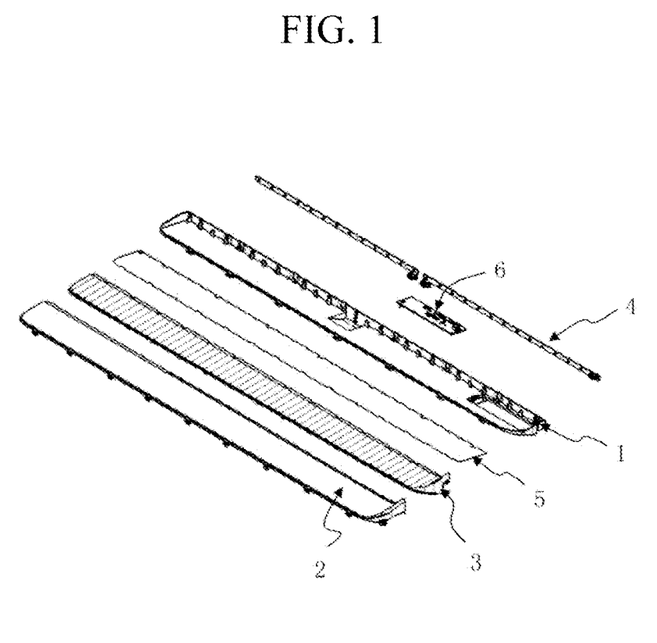
FIG. 1 is an exploded perspective view of a mood lamp with a dynamic effect according to various exemplary embodiments of the present disclosure.
Figure 2:
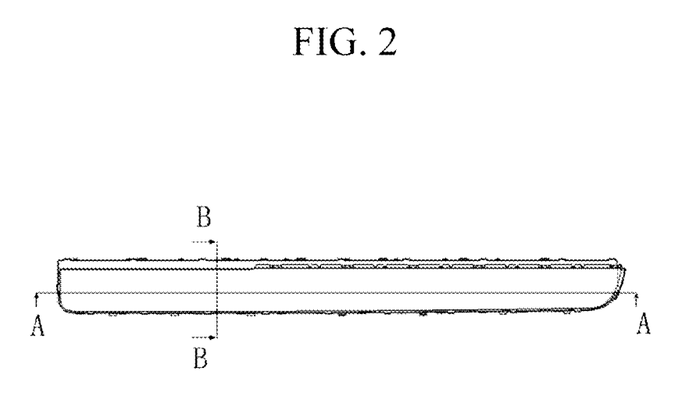
FIG. 2 is a schematic view showing a combined shape of a mood lamp with a dynamic effect according to various exemplary embodiments of the present disclosure corresponding to FIG. 1.
Figure 3:
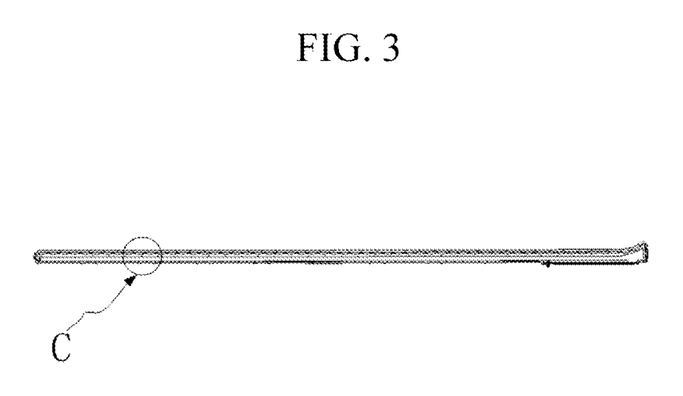
FIG. 3 is a cross-sectional view taken along a line A-A in FIG. 2.
Figure 4:
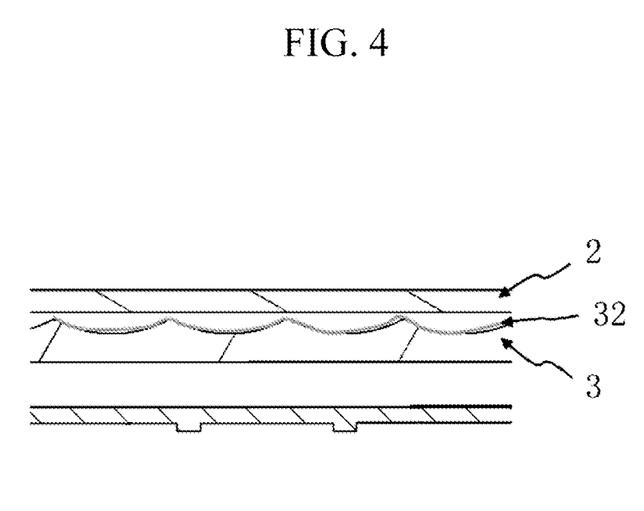
FIG. 4 is an enlarged schematic view of part C in FIG. 3.

In an exemplary embodiment of the present disclosure, as shown in FIG. 4, the surface of the light guide plate 3 including a wave pattern forms the metal plating layer 32 through vacuum aluminum plating or vacuum chrome plating.

Here, a different metal may be selected as a material of the metal plating layer 32.

In an exemplary embodiment of the present disclosure, as shown in FIG. 5 and FIG. 6, an edge portion of the cover 2 is provided on an interior material 7 of the vehicle to form an exposed portion 22 and an insertion portion 23.

The area of the light guide plate 3 is greater than that of the exposed portion 23 so that the entire exposed portion 22 may be irradiated by the light passing through the light guide plate 3, and an inclined transition portion 31 is formed at a position of the light guide plate 3 corresponding to the insertion portion 23 so that a straight edge portion does not exist, preventing a light output state of an end portion from becoming dark.

The mood lamp with the dynamic effect according to various exemplary embodiments of the present disclosure is fixed to an internal decoration panel of the vehicle such as a dashboard (see FIG. 8) and a door panel so that the internal decoration of the vehicle can generally establish a high-tech feeling.

In an exemplary embodiment of the present disclosure, the light source 4 is supported by an upper wall 12 or a lower wall of the bracket 1, and the light source 4 is positioned outside a range covered by the exposed portion 22.

In an exemplary embodiment of the present disclosure, as shown in FIG. 5 and FIG. 6, the light source 4 is supported by the upper wall 12 of the bracket 1 and is positioned outside the range covered by the exposed portion 22 to directly irradiate only the light reflective film 5, therefore, brightness is prevented from being uneven because the light source 4 is directly irradiated to a portion corresponding to the exposed portion 22 of the light guide plate 3.

In an exemplary embodiment of the present disclosure, the light reflection film 5 and the light guide plate 3 form a predetermined narrow angle.

In an exemplary embodiment of the present disclosure, as shown in FIG. 5 and FIG. 6, the bracket 1 is provided with an inclined surface 13, the inclined surface 13 becomes gradually away from the light guide plate 3 as the height thereof increases, and a lower portion of the light reflective film 5 is provided on the inclined surface 13 so that the light reflective film 5 and the light guide plate 3 form a constant angle. The light of the light source 4 is directly irradiated to the light reflection film 5, and the light reflected by the light reflection film 5 passes through the light guide plate 3, improving the overall brightness and light transmission uniformity of the mood lamp.

Figure 7:
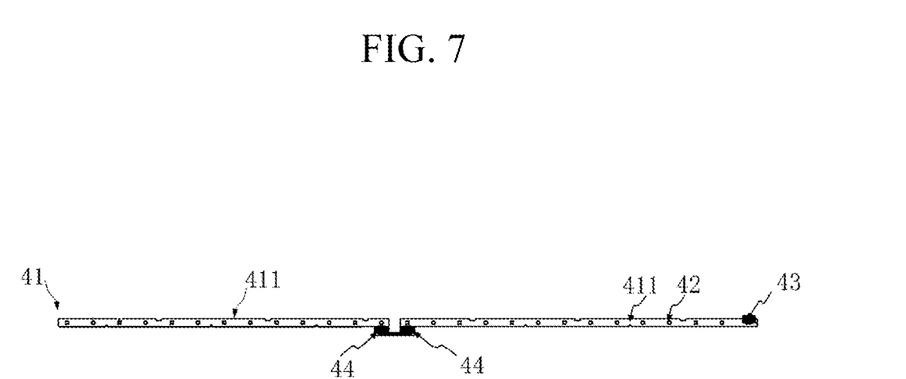
FIG. 7 is a schematic view showing a structure of a light source.
Figure 8:
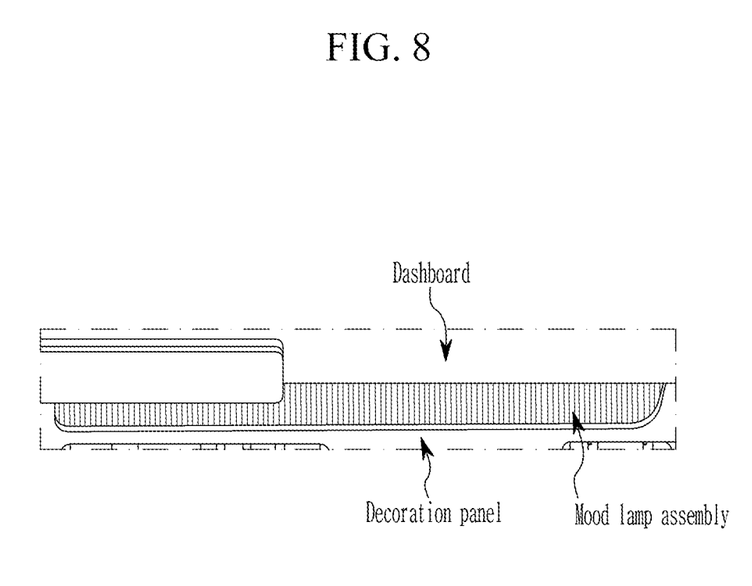
FIG. 8 is a schematic view showing a mounting position of a mood lamp with a dynamic effect.

In an exemplary embodiment of the present disclosure, as shown in FIG. 7, the light source 4 includes a light source board 41 and one or more LEDs 42 provided on the light source board 41. The light source board 41 is electrically connected to a driving circuit board 6 for controlling the LED 42 through a plug assembly 43.

In an exemplary embodiment of the present disclosure, as shown in FIG. 7, 26 LEDs 42 may be provided on the light source board 41.

In an exemplary embodiment of the present disclosure, the light source board 41 includes two or more sub boards 411, and the respective sub boards 411 are electrically connected to each other through a plug assembly 44.

In an exemplary embodiment of the present disclosure, as shown in FIG. 7, the light source board 41 includes two sub boards 411, and the two sub boards 411 may be electrically connected to each other through the plug assembly 44, and 13 LEDs 42 may be provided on the respective sub boards 411.

Only one light source board 41 may be provided.

In the illustrated exemplary embodiment of the present disclosure, the two sub boards 411 are provided, but the number of the sub boards 411 may be adjusted according to circumstances.

In an exemplary embodiment of the present disclosure, the LED 42 is a smart LED, and the driving circuit board 6 includes a controller.

The controller may individually control each smart LED to implement various mood lamp effects.

When the power of the light source 4 is turned on, the controller may be configured to control the number of lighting and a lighting sequence of the LEDs by controlling color, brightness, fade-in and fade-out times of each LED so that the mood lamp may implement various dynamic effects, such as a flow gradient, a breathing lamp, and an acoustic gradient, etc.

When the mood lamp is applied to the interior of the vehicle, various interconnection functions such as speed interconnection, driving mode interconnection, speeding notification, air conditioning interconnection, voice recognition and air quality interconnection may be added.

In an exemplary embodiment of the present disclosure, the power of the LEDs 42 is 0.1 W to 1 W, and a distance between the respective LEDs 42 is 20 mm to 40 mm.

In an exemplary embodiment of the present disclosure, the power of the LEDs 42 is 0.2 W, and the distance between the respective LEDs 42 is 30 mm.

The vehicle according to the exemplary embodiment of the present disclosure is provided with the mood lamp with the dynamic effect.

An operation of the mood lamp with the dynamic effect of the present disclosure will be described below with reference to the drawings.

When the light emission of the mood lamp is required, the power of the light source 4 is controlled to be turned on through a related switch. In the instant case, LED 42 of the light source 4 generates light, and the light of the LED 42 of the light source 4 is reflected by the light reflective film 5 and then passes through the light guide plate 3 and the cover 2 to implement light emission. Because the light source 4 is close to the one side of the light guide plate 3 and far away from the other side of the light guide plate 3, the mood lamp may emit light so that the brightness is gradually changed.

By controlling the driving circuit board 6 through an apparatus such as a center console of the vehicle, the LEDs 42 of the light source 4 may be controlled to produce different dynamic effects.

When the light emission of the mood lamp is not required, if the power of the light source 4 is controlled to be turned off through the related switch the LED 42 of the light source 4 does not generate light. The mood lamp becomes the decoration panel with the metallic decoration effect of the wave pattern, improving the layered feeling and luxury feeling of the vehicle interior material.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A mood lamp apparatus with a dynamic effect, the mood lamp apparatus comprising:
    a bracket configured to be mounted on a vehicle body;
    a cover provided on the bracket and used to form an appearance of the mood lamp apparatus;
    a light guide plate provided in an accommodation space formed by the cover and the bracket, adjacent to the cover, and including a surface close to the cover and including an uneven wave pattern, wherein a metal plating layer is provided on the surface including the wave pattern;
    a light source provided in the accommodation space to be close to a first side of the light guide plate and far away from a second side of the light guide plate; and
    a light reflection film provided in the accommodation space and reflecting a light emitted by the light source to a surface of the light guide plate away from the cover,
    wherein the reflected light sequentially passes through the light guide plate and the cover, and is then emitted to an outside of the cover,
    wherein the light source includes a light source board and one or more light-emitting diodes (LEDs) provided on the light source board,
    wherein the light source board is electrically connected to a driving circuit board for controlling the one or more LEDs through a plug assembly, and
    wherein the light source board includes two or more sub boards, and each of the two or more sub boards is electrically connected to each other through the plug assembly.

2. The mood lamp apparatus of claim 1, wherein the cover is made of a polycarbonate (PC) material, and an external surface thereof is a flat surface.

3. The mood lamp apparatus of claim 1, wherein an external surface of the cover has a leather pattern to form a translucent matte effect.

4. The mood lamp apparatus of claim 1, wherein the surface of the light guide plate including the wave pattern forms the metal plating layer through vacuum aluminum plating or vacuum chrome plating.

5. The mood lamp apparatus of claim 1,
    wherein an edge portion of the cover is provided on an interior material of a vehicle to form an exposed portion and an insertion portion, and
    wherein an area of the light guide plate is greater than an area of the exposed portion, and an inclined transition portion is formed at a position of the light guide plate corresponding to the insertion portion.

6. The mood lamp apparatus of claim 5, wherein the light source is supported by an upper wall or a lower wall of the bracket, and the light source is positioned outside a range covered by the exposed portion.

7. The mood lamp apparatus of claim 1, wherein the one or more LEDs are smart LEDs, and the driving circuit board includes a controller.

8. The mood lamp apparatus of claim 1, wherein the light reflection film has a flat surface inclined to have a constant angle between the flat surface and the light guide plate so that a light emitted from the light source is directed toward the light guide plate by the light reflection film.

9. The mood lamp apparatus of claim 8, wherein the bracket includes an inclined surface which becomes away from the light guide plate as a height thereof increases, and a lower portion of the light reflective film is provided on the inclined surface so that the flat surface of the light reflective film and the light guide plate form the constant angle.

10. The mood lamp apparatus of claim 1, wherein the bracket includes an inclined surface which becomes away from the light guide plate as a height thereof increases, and a lower portion of the light reflective film is provided on the inclined surface so that the light reflective film and the light guide plate form a constant angle.

11. A vehicle provided with the mood lamp apparatus with the dynamic effect of claim 1.

* * * * *